US008886729B2

(12) United States Patent
Karpov et al.

(10) Patent No.: US 8,886,729 B2
(45) Date of Patent: Nov. 11, 2014

(54) METHODS, SYSTEMS AND COMPUTER PROGRAM PRODUCTS FOR A MOBILE-TERMINATED MESSAGE SPAM RESTRICTOR

(75) Inventors: Sergei Karpov, Concord, CA (US); Thaddeus Jude Dudziak, Pleasanton, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1046 days.

(21) Appl. No.: 12/610,027

(22) Filed: Oct. 30, 2009

(65) Prior Publication Data

US 2011/0106890 A1 May 5, 2011

(51) Int. Cl.
*G06F 15/16* (2006.01)
*G06Q 10/10* (2012.01)

(52) U.S. Cl.
CPC .................................... *G06Q 10/107* (2013.01)
USPC ........... 709/206; 709/201; 709/202; 709/203; 709/207

(58) Field of Classification Search
USPC .......................... 709/206, 201, 202, 203, 207
See application file for complete search history.

(56) References Cited

U.S. PATENT DOCUMENTS

| | | | | |
|---|---|---|---|---|
| 7,577,239 | B1 * | 8/2009 | Shim et al. | 379/88.22 |
| 2002/0168033 | A1 * | 11/2002 | Suzuki et al. | 375/341 |
| 2005/0021649 | A1 * | 1/2005 | Goodman et al. | 709/207 |
| 2006/0047769 | A1 * | 3/2006 | Davis et al. | 709/207 |
| 2006/0168033 | A1 * | 7/2006 | Cai et al. | 709/206 |
| 2007/0282567 | A1 * | 12/2007 | Dawson et al. | 702/186 |
| 2007/0294154 | A1 * | 12/2007 | Henninger | 705/35 |
| 2008/0109547 | A1 * | 5/2008 | Bao et al. | 709/224 |
| 2008/0183519 | A1 * | 7/2008 | King et al. | 705/7 |
| 2008/0183529 | A1 * | 7/2008 | Berman et al. | 705/7 |
| 2009/0013054 | A1 * | 1/2009 | Libbey et al. | 709/207 |
| 2009/0111430 | A1 * | 4/2009 | Li et al. | 455/412.1 |

* cited by examiner

*Primary Examiner* — Lan-Dai T Truong

(57) ABSTRACT

This disclosure details the implementation of methods, systems and computer program products for mobile terminated message SPAM control (hereinafter, "M-SPAM Restrictor"). In one embodiment, M-SPAM Restrictor systems implement a live application at a mobile network element that processes message service, whereby a message rate limit is set on the element, and a message source may be blocked from further messaging activity if the rate of message activity exceeds the rate limit, until the offending source has resolved the issue with the service provider (carrier).

20 Claims, 7 Drawing Sheets

METHODS, SYSTEMS AND COMPUTER PROGRAM PRODUCTS FOR A MOBILE-TERMINATED MESSAGE SPAM RESTRICTOR

BACKGROUND

Mobile-terminated messages may be sent from a valid mobile directory number (MDN), a valid telephone number (TN), or a valid Internet-to-mobile message provider to mobile subscribers from sources on different carrier networks. Such messages may be sent in a broadcast manner such that a large volume of message traffic may be generated from the same MDN or TN in a short period of time. Some mobile-terminated messages are unwanted and are also known as SPAM.

Figure 1:
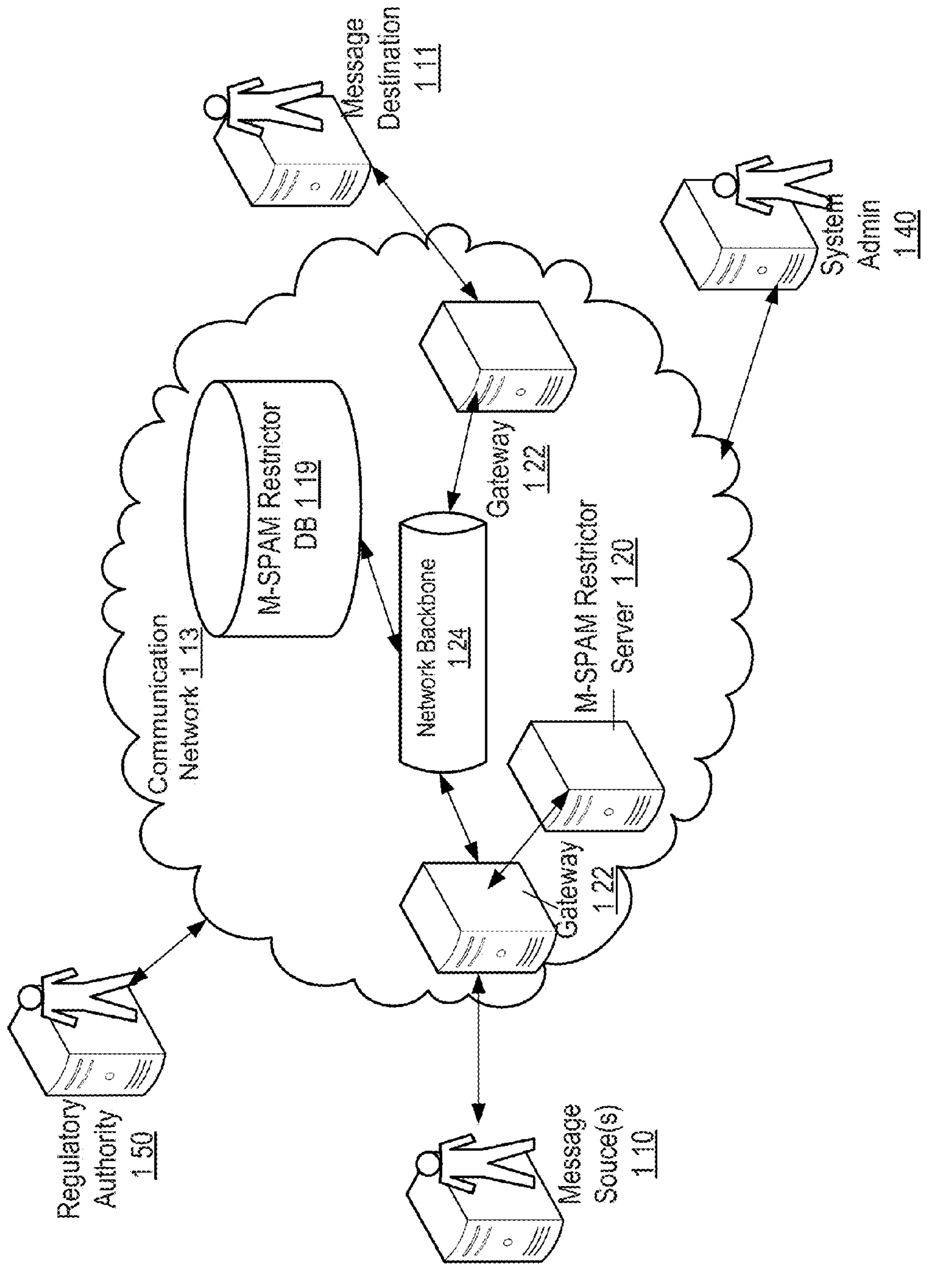
FIG. 1 provides an overview of an implementation of data flow between a mobile-terminated message SPAM restrictor (hereinafter "M-SPAM Restrictor") system and affiliated entities in one embodiment of M-SPAM Restrictor operation.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION OF PREFERRED EMBODIMENTS

This disclosure details the implementation of methods, systems and computer program products for a mobile-terminated message SPAM restrictor (hereinafter, "M-SPAM Restrictor"). In one embodiment, M-SPAM Restrictor systems implement a live application at a mobile network element that interacts with message services, whereby a message rate limit is set on the network element, and a message source may be blocked from further messaging activity if it exceeds the rate limit, until the offending source has resolved the issue with the service provider (carrier).

For example, in one embodiment, the M-SPAM Restrictor application may be installed in the Short Message Peer-to-Peer (SMPP) gateway of a mobile cellular network. A rate limit, e.g. 10 Mega bits per second (Mb/second) for a message source, is set in the SMPP gateway to monitor the Short Message Service (SMS) traffic from any possible message source. In another implementation, the rate limit may be set as the average number of messages received per second from a message source, e.g. 10 SMS per second. Once the SMPP gateway detects that one message source, e.g. a valid mobile directory number (MDN), is generating large volumes of SMS traffic which exceed the rate limit of 10 Mb/s, the SMPP gateway may block the offending MDN for any further SMS traffic by refusing to route SMS data from the offending MDN to any message delivery platforms, e.g. a Short Message Service Center (SMSC). The restraint on the offending MDN may be removed by a system administrator after the registered user of the MDN has negotiated with the carrier and received approval for further SMS service.

In one embodiment, a method is disclosed, comprising: receiving a plurality of mobile terminated messages from a message source; estimating an instant message rate of the message source based on the received plurality of mobile terminated messages; accessing a message rate limit for the message source; comparing the estimated message rate of the message source with the accessed message rate limit; and identifying the message source as a SPAM suspect and suspending all subsequent messages sent from the message source if the estimated message rate of the message source exceeds than the accessed message rate limit.

It is to be understood that, depending on the particular needs and/or characteristics of a M-SPAM Restrictor application, administrator, server, data payload, monetization model, hardware configuration, network framework, and/or the like, various embodiments of the M-SPAM Restrictor may be implemented that enable a great deal of flexibility and customization. The instant disclosure discusses embodiments of the M-SPAM Restrictor primarily within the context of message SPAM of wireless cellular communications. However, it is to be understood that the system described herein may be readily configured/customized for a wide range of other applications or implementations. For example, aspects of the M-SPAM Restrictor may be adapted for wired telephony services (e.g. telephone call SPAM, etc), computer-based communications (e.g. E-mail SPAM, online instant message SPAM, etc.), and/or the like applications. It is to be understood that the M-SPAM Restrictor may be further adapted to other implementations or communications and/or data transmission applications, such as but not limited to Internet Protocol Multimedia Subsystem (IMS), and/or the like.

FIG. 1 provides an overview of an implementation of data flow between an M-SPAM Restrictor system and affiliated entities in one embodiment of M-SPAM Restrictor operation. In FIG. 1, a message source (or sources) 110, an M-SPAM Restrictor server 120, a message destination 111, a system administrator 140 and a regulatory authority 150 are shown to interact via a communication network 113 during M-SPAM Restrictor operation, wherein the communication network 113 includes a plurality of gateways 122 and a network backbone 124. The message source 110 may include a wide variety of different communications devices and technologies that possess mobile messaging functionality within embodiments of M-SPAM Restrictor operation. For example, in one embodiment, the message source 110 may include, but is not limited to, cellular telephony handsets, BlackBerries, iPhones, Internet-to-mobile message services and/or the like. In one embodiment, a message generated by the message source 110 may be sent through the communication network 113 and processed at the gateway 122, wherein the message includes a pure text short message, and/or a multimedia message such as pictures, videos, etc. The message may then be transmitted through a network backbone 124 and arrive at another gateway 122, and finally be routed to the message destination 111.

In one embodiment, an M-SPAM Restrictor server 120 may be equipped at the gateway 122. The M-SPAM Restrictor server 120 may be applied on any network element that processes messages, such as, but not limited to SMPP Gateway, SMSC, Multimedia Message Service Center (MMSC), Wireless Intelligent Gateway (WIG), and/or the like. In another embodiment, an M-SPAM Restrictor may be directly installed at the device of a message source 110.

Figure 3:
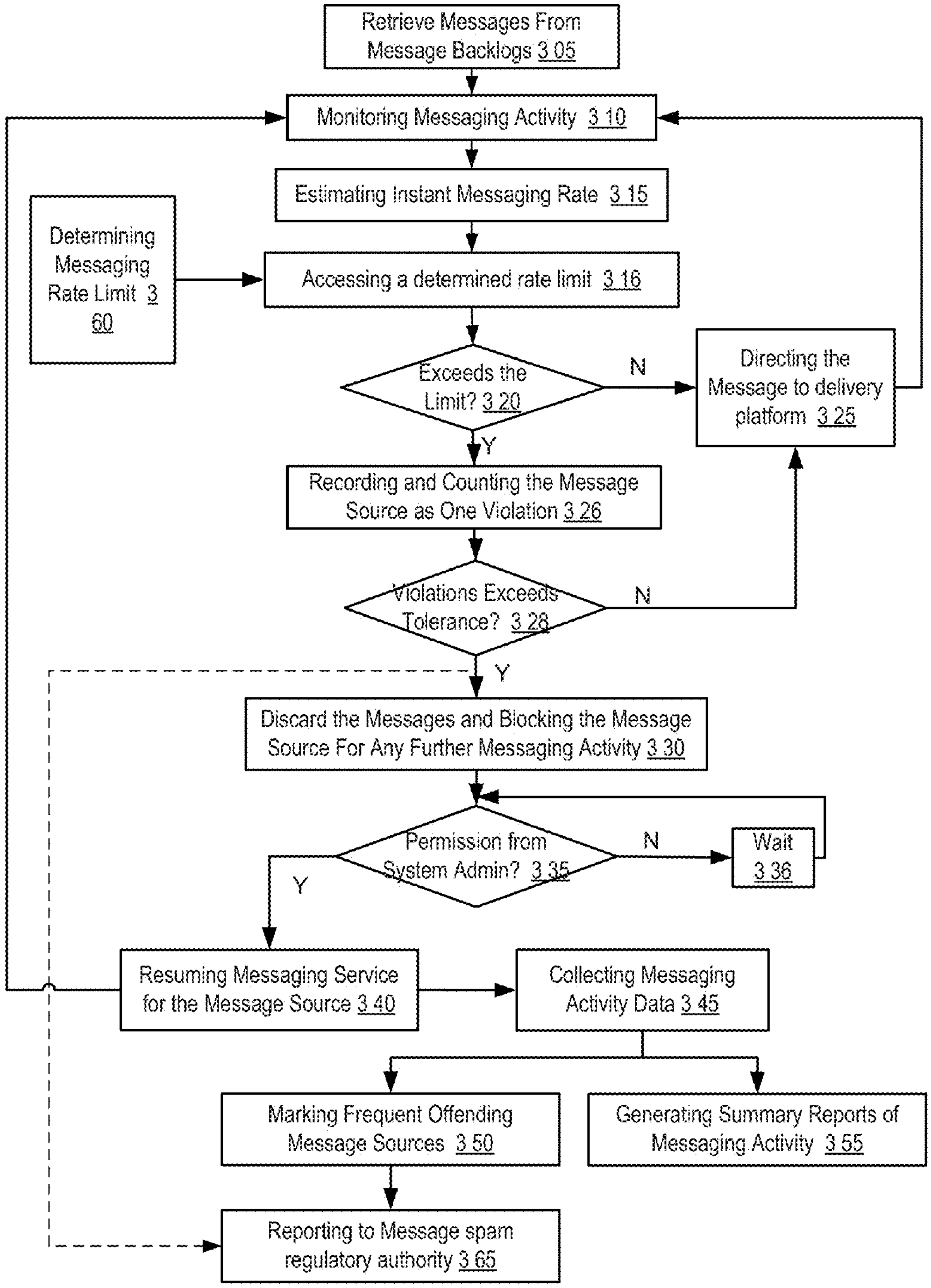
FIG. 3 provides an overview logic flow diagram illustrating aspects of implementing a M-SPAM Restrictor in one embodiment of M-SPAM Restrictor operation.

As will be illustrated in one embodiment in FIG. 3, the M-SPAM Restrictor server 120 may monitor the messaging traffic generated from the message source 110, and determine if there is any SPAM activity. Once a SPAM source has been identified, the M-SPAM Restrictor server 120 may inform the message source 110 by sending a notice and blocking further messaging activity, and then submit the information of the SPAM source to a system administrator 140. In one embodiment, the system administrator 140 may be a managing operator of the carrier of the communication network 113.

In one embodiment, the M-SPAM Restrictor server 120 may also communicate with an M-SPAM Restrictor database 119. In some embodiments, an M-SPAM Restrictor server 120 may be integrated with a local M-SPAM Restrictor database 119. In other embodiments, an M-SPAM Restrictor server 120 may access a remote M-SPAM Restrictor database 119 via a network backbone 124, or the communication network 113. In one implementation, the M-SPAM Restrictor server 120 may send information of a SPAM source to the database 119, such as once the SPAM source is identified. The M-SPAM Restrictor server 120 may also submit and store data recording messaging traffic associated with one or more message sources in the M-SPAM Restrictor database 119. In one embodiment, the M-SPAM Restrictor database may provide historical data of messaging traffic to the M-SPAM Restrictor server 120 for functional purposes, e.g. for determining a rate limit (as will be illustrated in FIG. 4A-4C).

A message source 110 blocked for message service as being a SPAM source may in one implementation, communicate with the system administrator 140 and the system administrator 140 may send indications to the M-SPAM Restrictor server 120 establishing whether to resume message service for the offending source. In another embodiment, the system administrator 140 may communicate with the M-SPAM Restrictor server 120 and the M-SPAM Restrictor database 119 for regular maintenance, service failure, system updates, database renewal, and/or the like. In one embodiment, the system administrator 140 may directly operate with the M-SPAM server 120 and the M-SPAM Restrictor database 119 on an in-house basis. In another embodiment, the system administrator 140 may remotely access the M-SPAM Restrictor server 120 and the M-SPAM Restrictor database 119 to engage its functionality via the communication network 113. In one implementation, the system administrator 140 may report to a regulatory authority 150 regarding an offending source, for example, when the offending source has violated the law, e.g. the Controlling the Assault of Non-Solicited Pornography and Marketing Act (CAN-SPAM Act) of 2003.

Figure 2:
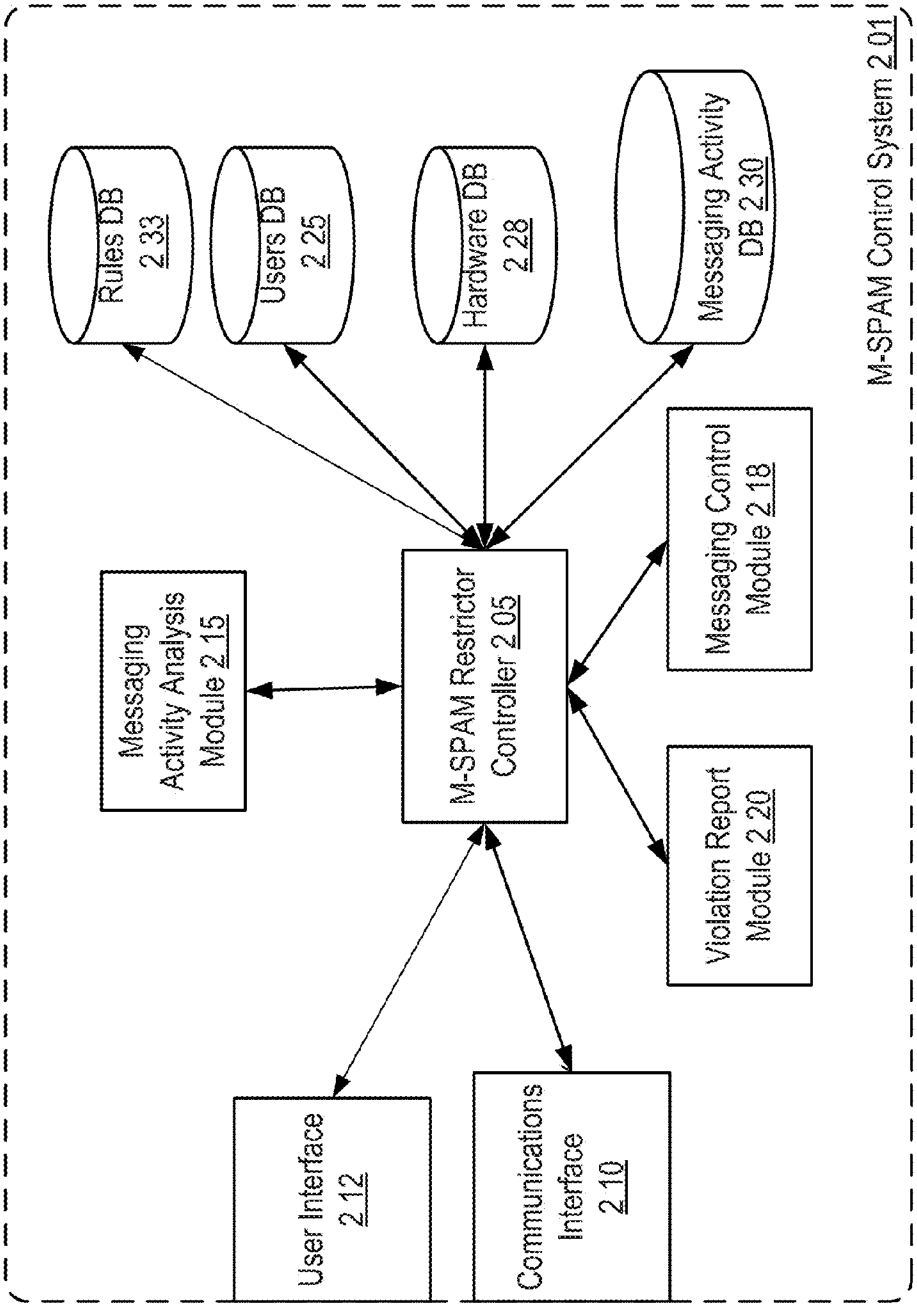
FIG. 2 shows an implementation of M-SPAM Restrictor system components in one embodiment of M-SPAM Restrictor operation.

FIG. 2 shows an implementation of M-SPAM Restrictor system components in one embodiment of M-SPAM Restrictor operation. The M-SPAM Restrictor system 201 may contain a number of functional modules and/or data stores. An M-SPAM Restrictor controller 205 may serve a central role in some embodiments of M-SPAM operation, serving to orchestrate the reception, generation, and distribution of data and/or instructions, to, from, and between M-SPAM Restrictor components and/or mediate communications with external entities and systems.

In one embodiment, the M-SPAM Restrictor controller 205 may be housed separately from other modules and/or databases within the M-SPAM Restrictor system, while in another embodiment, some or all of the other modules and/or databases may be housed within and/or configured as part of the M-SPAM Restrictor controller. Further detail regarding implementations of M-SPAM Restrictor controller operation, modules, and databases is provided below.

In the implementation illustrated in FIG. 2, the M-SPAM Restrictor controller 205 may be configured to couple to external entities via a communications interface 210. The communications interface may, for example, configure messages sent from a message source, SPAM report information to a regulatory authority, and receipt and/or transmission of data to an external and/or network database. In various implementations, a communications interface 210 may, for example, serve to configure data into application, transport, network, media access control, and/or physical layer formats in accordance with a wireless cellular communication protocol, such as, but not limited to Global System for Mobile communications (GSM), Code Division Multiple Access (CDMA), and/or the like. The communications interface 210 may further be configurable to implement and/or translate Wireless Application Protocol (WAP), TCP/IP, and/or the like data formats and/or protocols. The communications interface 210 may further house one or more ports, jacks, antennas, and/or the like to facilitate wired and/or wireless communications with and/or within the M-SPAM Restrictor system. In one implementation, the M-SPAM Restrictor controller 205 may also be configured to couple to a user interface 212. The user interface 212 may, for example, receive control indications and data information from an external user input, or output information to an external user. In one embodiment, the user interface 212 may include, but is not limited to, keyboard(s), mouse(s), display screen(s), electronic stylus(es), printer(s), and/or the like.

In one implementation, the M-SPAM Restrictor controller 205 may further be coupled to a plurality of modules configured to implement M-SPAM functionality and/or services. A messaging activity analysis module 215 may, in one implementation, be configurable to monitor the messaging traffic of one or more message sources, and determine a message rate limit, such as may be based on stored traffic data, simulation models, and/or the like. The messaging activity analysis module 215 may, in one implementation, be further configurable to communicate with a messaging activity database 230 to record historical data of message traffic. For example, in one embodiment, the message activity analysis module 215 may generate message traffic reports based on the historical data stored in the messaging activity database 230 as will be illustrated in FIG. 4C. In one embodiment, the messaging activity analysis module 215 may determine a message rate limit based on historical data and human behavioral simulation models, as will be illustrated in one implementation in FIG. 4A. For example, in one embodiment, the message rate limit may be determined by the simulated message rate by human behaviors, wherein associated with sending a message, including consideration of the time associated with selecting a messaging mode (text, picture or video), entering message destination, composing the message, sending the message, waiting for a "message sent" response, clearing the "message sent" response, and/or the like.

A messaging control module 218 may, in some embodiments, block an offending message source for any further message activity if the message rate from such source is equal to and/or higher than the rate limit determined by the messaging activity analysis module 215, and/or remove blockage of message service of the offending message source upon approval of the system administrator of the carrier. In some embodiments, the messaging control module 218 may be configured to communicate with messaging activity database 230 to record offending sources, and/or update the information accordingly in a users database 225. For example, the messaging control module 218 may record the activity of the offending source in an associated user profile in the users database 225. A violation report module 220 may, in some embodiments, communicate with the messaging control module 218 to collect SPAM information and submit it to a regulatory authority.

In one implementation, the M-SPAM Restrictor controller 205 may further be coupled to one or more databases configured to store and/or maintain M-SPAM Restrictor data. A users database 225 may contain information pertaining to message sources and/or destinations, contact information, profile information, identities of hardware devices, Customer Premise Equipments (CPEs), and/or the like associated with users, message service preferences, message history, SPAM history, system settings, and/or the like. In one implementation, the users database 225 may record a SPAM history of a user, e.g. if a user is once identified as a SPAM source, relevant data of the SPAM violation such as date and time, instant message rate, may be recorded. A hardware database 228 may contain information pertaining to hardware devices with which the M-SPAM Restrictor system may communicate, such as but not limited to message servers, user telephony devices, CPEs, gateways, routers, and/or the like. The hardware database 228 may specify transmission protocols, data formats, and/or the like suitable for communicating with hardware devices employed by any of a variety of M-SPAM Restrictor affiliated entities. A messaging activity database 230 may contain data pertaining to messaging traffic recorded previously and/or updated by the message activity analysis module, which includes information such as, but not limited to real-time data workload of messaging traffic, statistical results of messaging traffic (e.g., classified by geographical distributions, message type, source type, and/or the like; in one implementation, statistical results may be dynamically updated based on characteristics of identified SPAM sources), records of offending SPAM sources, and/or the like (as will be illustrated in FIG. 4C). A rules database 233 may store related regulatory rules of message SPAM.

The M-SPAM Restrictor database may be implemented using various data-structures, such as, but not limited to, an array, hash, (linked) list, struct, structured text file (e.g., XML), table, and/or the like. For example, in one embodiment, the XML for a User Profile in the user database 225 may take a form similar to the following example:

```
<User>
    <Quasi-static info>
        <User_ID>123-45-6789</User_ID>
        <Hardware ID> Nokia 660 </Hardware ID>
        <Census info> John Smith; 123 Maple Dr., Smalltown,
                    CA 92676; (123)456-7890;
              jsmith@email.com; 25 years; male; white;
              single, etc.
        </Census info>
        <Contact restrictions>Weekdays 8 AM - 7 PM only
        </Contact restrictions>
    </Quasi-static info>
    <Dynamic info>
        <Message Service record>
            <Service_#1>
                <Time> 08/21/2006 13:45:28 </Time>
                <Destination> 987-654-3210
                </Destination>
                <Message Type> MMS; JPG picture
                </Message Type>
                <Size> 322 Kb
                </Size>
            </Service_#1>
            <Service_#2>
            etc...
```

-continued

```
            </Service_#2>
        etc...
        </Message Service record>
        <SPAM Record>
            <Time> 04/05/2008 14:30 </Time>
            <Message Rate> 15 Mb/s </Message Rate>
            <Comment> Resolved; re-permitted 04/06/2008 15:45
            </Comment>
        </SPAM Record>
        <Message statistics>
            <Time> 04/05/2009 </Time>
            <Monthly Average Rate> 54261 Kb/Mon
            </Monthly Average Rate>
            <Monthly Peak Rate> 4345 Kb/S
            </Monthly Peak Rate>
            etc...
        </Service statistics>
</User>
```

In one embodiment, data accumulated in a plurality of user profiles may be analyzed to extract statistical information about the regular message rate of the user. This information may be stored associated with the messaging activity in the messaging activity database 230.

FIG. 3 provides an overview of logic flow illustrating aspects of implementing a M-SPAM Restrictor within one embodiment of M-SPAM Restrictor operation. A M-SPAM server may retrieve messages from message backlogs 305. For example, in one implementation, the messages in the message backlogs may have header information comprising a message source, at least one message destination and a timestamp that the message is generated and sent. In one embodiment, the message backlog may be implemented with data structures such as, but not limited to, queues, stack, hash, and/or the like.

The M-SPAM Restrictor server may constantly, periodically, and/or intermittently monitor and record the messaging activity of the message source 310 and estimate a message rate of the message source 315. For example, in one embodiment, the M-SPAM Restrictor server may record the total volume of message traffic originated from the message source within a fixed short time interval starting at the instant time, and the instant message rate may then be calculated by dividing the recorded message traffic by the length of the short time interval. In one implementation, the length of the short time interval may be predetermined by a system administrator (e.g., 10 milliseconds). The M-SPAM Restrictor server may then access a determined rate limit 316, and compare the instant message rate of the message source with the rate limit. The message rate limit may be determined 360 in different ways, which will be further illustrated in one implementation in FIG. 4A. In one implementation, the rate limit may be a constant value specified for a particular message source, or a constant value over a period of time and/or geographical location. In another implementation, the rate limit may be a dynamic formula of several variables. For example, in one embodiment, the rate limit of a message source may be a function of various factors, such as, but not limited to time and date, geographical location, messaging activity of interrelated message sources, weighing factors from historical statistics and/or the like. If the instant message rate does not exceed the rate limit 320, the message may be directed to a message delivery platform 325 e.g. an SMPP gateway, SMSC, etc., for further processing. If the estimated instant message rate exceeds the rate limit 320, the M-SPAM Restrictor server may then, in one embodiment, record and count the violation 326 and further determine whether the degree of violations exceeds a tolerance level defined by the system administrator 328, such as, but not limited to the accumulated number of violations exceeding a predetermined maximum value, and/or the like. If the recorded violations have not exceeded the tolerance level, the system may then route the message to its destination via the delivery platform 325. Otherwise, if the recorded violations have met the upper bound, the M-SPAM Restrictor server may discard any intended messages from the source, and block and/or instruct the blockage of the message source for any further messaging activity 330. For example, in one embodiment, the M-SPAM Restrictor server may filter the SPAM message at the SMPP gateway. In one implementation, the M-SPAM Restrictor may store unsent messages in a repository, such as for subsequent review by a system administrator. In one embodiment, the M-SPAM Restrictor server may block the message service 330 once a SPAM violation is detected without counting accumulations. In one embodiment, if the M-SPAM Restrictor server receives indications from the system administrator requesting permission for the offending source to resume message service 335, the M-SPAM Restrictor server may then resume regular message service of the message source 340, and keep monitoring the message activity of the source. If no permission request is received from the system administrator, then the message source may remain prohibited from any message activity and may wait 326 until the blockage is removed.

In some embodiments, the M-SPAM Restrictor server may periodically collect and process messaging activity data 345. In one implementation, the M-SPAM Restrictor server may then mark the frequently offending sources 350 based on the collected messaging activity data, and/or report the SPAM sources to a message SPAM regulatory authority 365. In one embodiment, the M-SPAM Restrictor server may also determine to report to a message SPAM regulatory authority 365 when severe violations have been committed by the message source at 328. In another implementation, the M-SPAM Restrictor server may utilize collected messaging activity data to generate message activity summary reports 355, which will be further illustrated in one implementation in FIG. 4C. The generated reports of messaging activity may be applied in one implementation as historical data to facilitate modeling and determining the message rate limit 360.

Figure 4A:
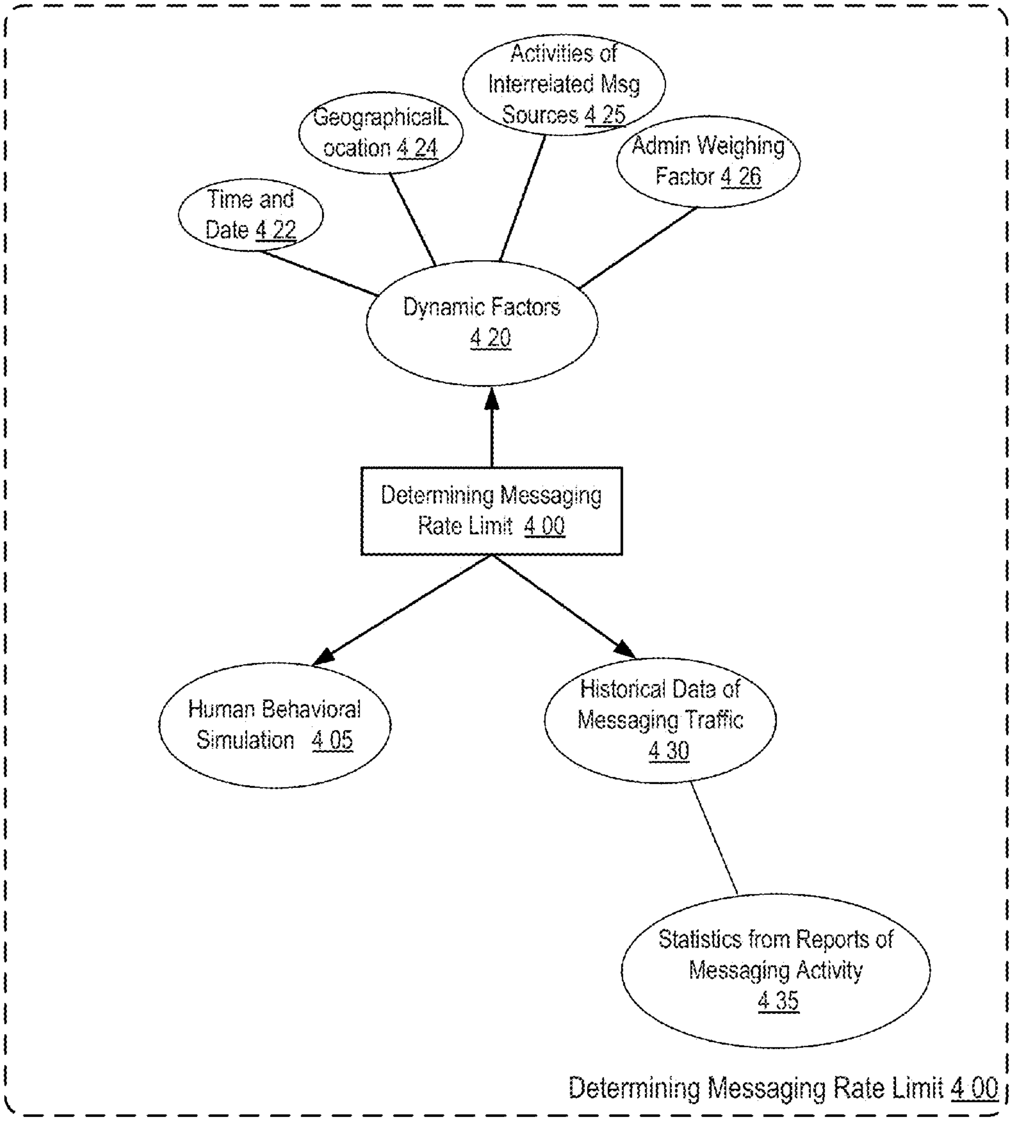
FIGS. 4A-4C show aspects of logic flows of message rate limit setting and messaging activity reporting in embodiments of M-SPAM Restrictor operation.
Figure 4B:
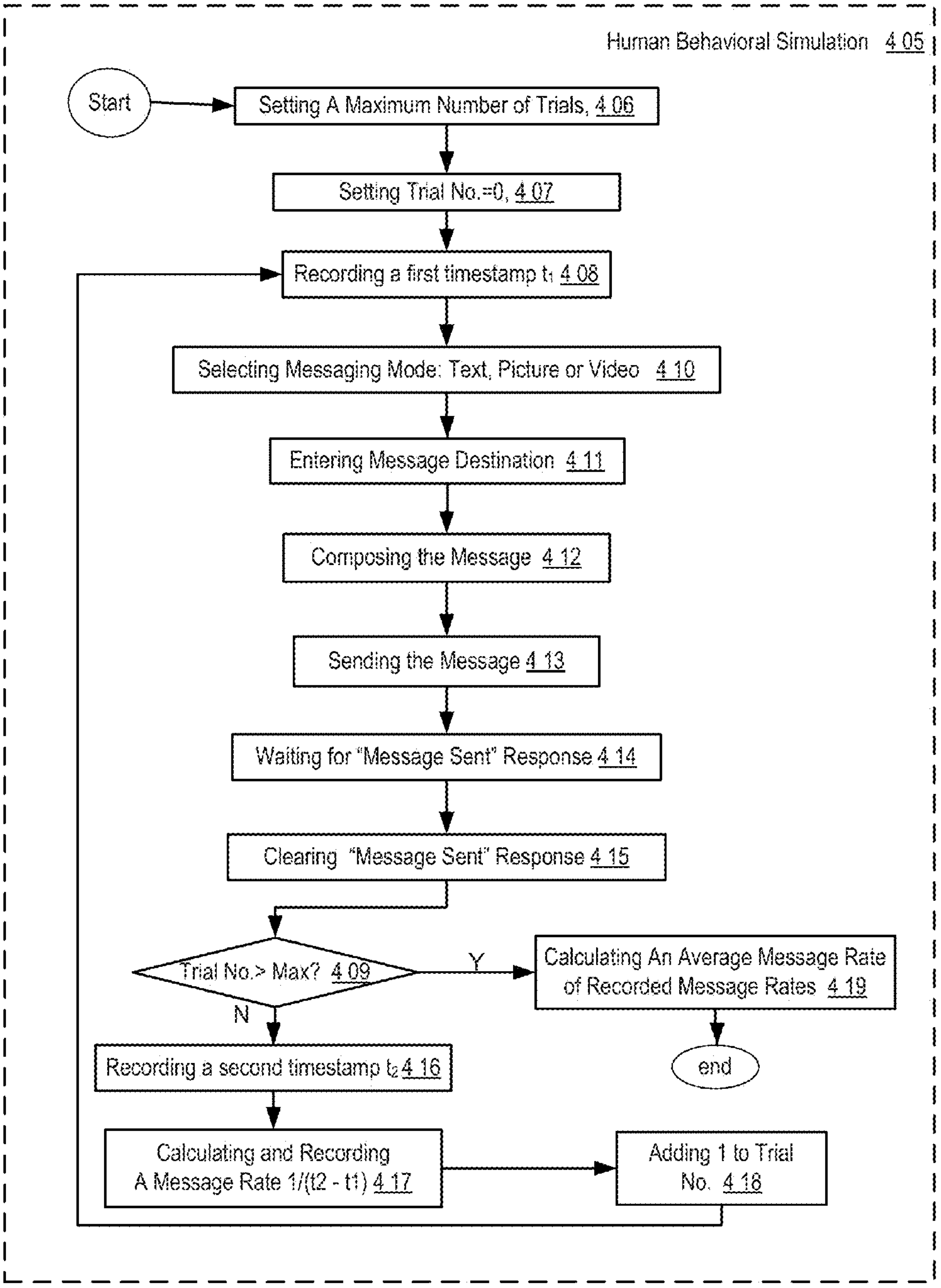
Figure 4C:
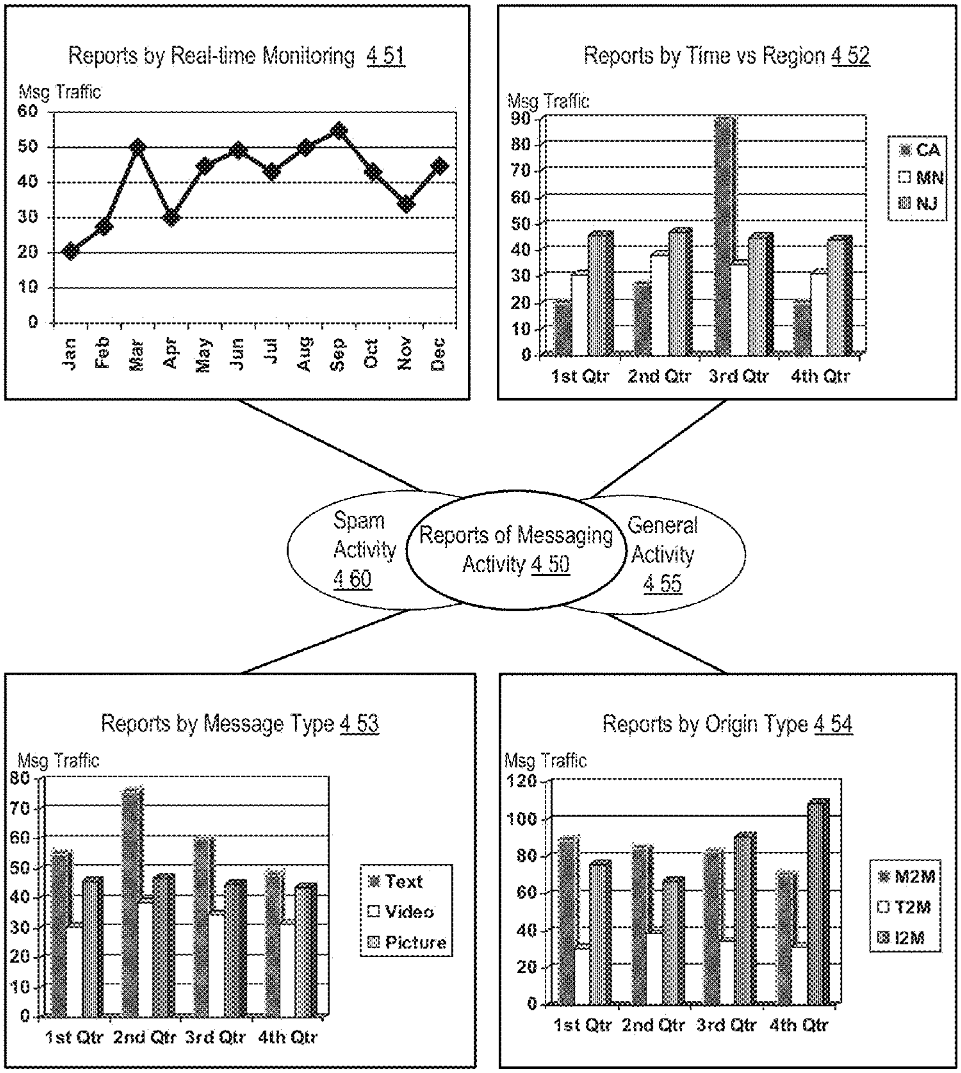

FIGS. 4A-4C show aspects of logic flows of message rate limit setting and messaging activity reporting in embodiments of M-SPAM Restrictor operation. FIG. 4A illustrates different aspects of determining a message rate limit within embodiments of M-SPAM Restrictor operation. As discussed above, in one embodiment, the message rate limit may be a constant value per message source or per region, while in another embodiment, the message rate limit may have a dynamic structure and evolve by time. In one embodiment, the message rate limit may be source specific, as different types of message sources may vary in message generation capacity, rate and/or the like. In one embodiment, carriers may determine different message rate limits for messages originating from sources within the same carrier network and those from different carrier networks. In one embodiment, the M-SPAM Restrictor server may determine a message rate limit based on historical data of messaging traffic 430, for example, by analyzing statistics of reports of message activity 435, such as mean message rates, variance and standard deviation of message rates in the recorded message activity. FIG. 4C will further illustrate implementations of message activity reports. In one embodiment, the message rate limit may be determined by simulating and analyzing human messaging behaviors 405, as illustrated in one implementation in FIG. 4B.

For example, in some embodiments, as shown in FIG. 4B, a Monte Carlo simulation may be implemented to simulate the process of sending a message. The M-SPAM Restrictor may determine a maximum number of trials for the Monte Carlo simulation 406, and a counting variable for trial number as zero 407. At every trial, the simulator may record a first timestamp $t_1$ and then simulate messaging activities such as selecting messaging mode as text, picture or video 410, entering the message destination 411, composing the message 412, sending the message 413, waiting for the "message sent" response 414, and clearing the display of "message sent" response 415, wherein the time to accomplish each step may be assumed to follow certain probabilistic distributions, such as, but not limited to, Poisson distributions, exponential distributions, normal distributions, and/or the like. The simulator may then record a second timestamp $t_2$ 416 and calculate a simulated message rate for the instant trial by $1/(t_2 - t_1)$ 417, and update the trial number 418 by adding one. The simulator may then determine whether the trial number has met the set maximum value of trial number 409. If not, the simulation may continue at step 408. If the maximum number of trials has been reached, the Monte Carlo trial is terminated and an average message rate may be calculated based on the recorded message rates of past trials 419. In one embodiment, the time to accomplish each step may be assumed to be a constant, and the message rate limit may be determined by summing up all of the estimated times to accomplish each message activity. The M-SPAM Restrictor server may then leverage the simulated message rate to determine a rate limit for a message source, for example, by increasing the simulated message rate with a predetermined percentage. In another embodiment, dynamic factors 420 may be further incorporated into the framework of determining the rate limit, such as time 422, location 424, administrative weighting factors 426, and/or the like. For example, the message rate limit may differ by time 422, as holiday seasons may witness higher non-SPAM message volumes. In another embodiment, message sources may be grouped as interrelated message sources 425 by their contact relations, such that frequent message activity between close contacts may not be identified as SPAM activity. In one implementation, certain administrative weighting factors 426 may also be included, such as, but not limited to the service plan of the message source, and/or the like.

FIG. 4C provides schematic interfaces of sample reports of messaging activity in embodiments of M-SPAM Restrictor operation. In one embodiment, the M-SPAM Restrictor server may generate summary reports of messaging activity 450, including reports for general message traffic 455 and reports specialized for SPAM activity 460. The generated messaging activity reports may include, but are not limited to, reports of real-time monitoring data of messaging activity 451 from one or more message sources, reports of messaging volume per time period and geographical region 452, reports of messaging volume comparison classified by message type 453, reports of messaging volume comparison classified by source type 454, and/or the like. For example, in FIG. 4C, a schematic report is provided to illustrate real-time message traffic monitoring 451, which reflects message traffic from January to December of one year. Sample report 452 illustrates a comparison of total message volume for three different states in each quarter of the fiscal year. Sample report 453 illustrates the relative amounts of message volume for text messages, messages including videos, and messages including pictures. Sample report 454 illustrates the relative amounts of message volume generated from different sources, for example, messages sent from telephone to mobile, from mobile to mobile and from Internet to mobile. Note that the sample reports of FIG. 4C, 451-454, all, are for non-limiting illustrative purposes only.

In one embodiment, message rate limits determined based on the messaging activity reports may be different over time, geographical regions, message types, message origin types, and/or the like. For example, in FIG. 4C, the third quarter of the year has, been shown to have higher message traffic and may be set with a higher message rate limit during the time period. For another example, Internet originated messages may be set with a higher message rate limit than other origin types as Internet-to-mobile message traffic is higher than the other two origin types as shown in the sample report 454 of FIG. 4C.

M-SPAM Restrictor Controller

Figure 5:
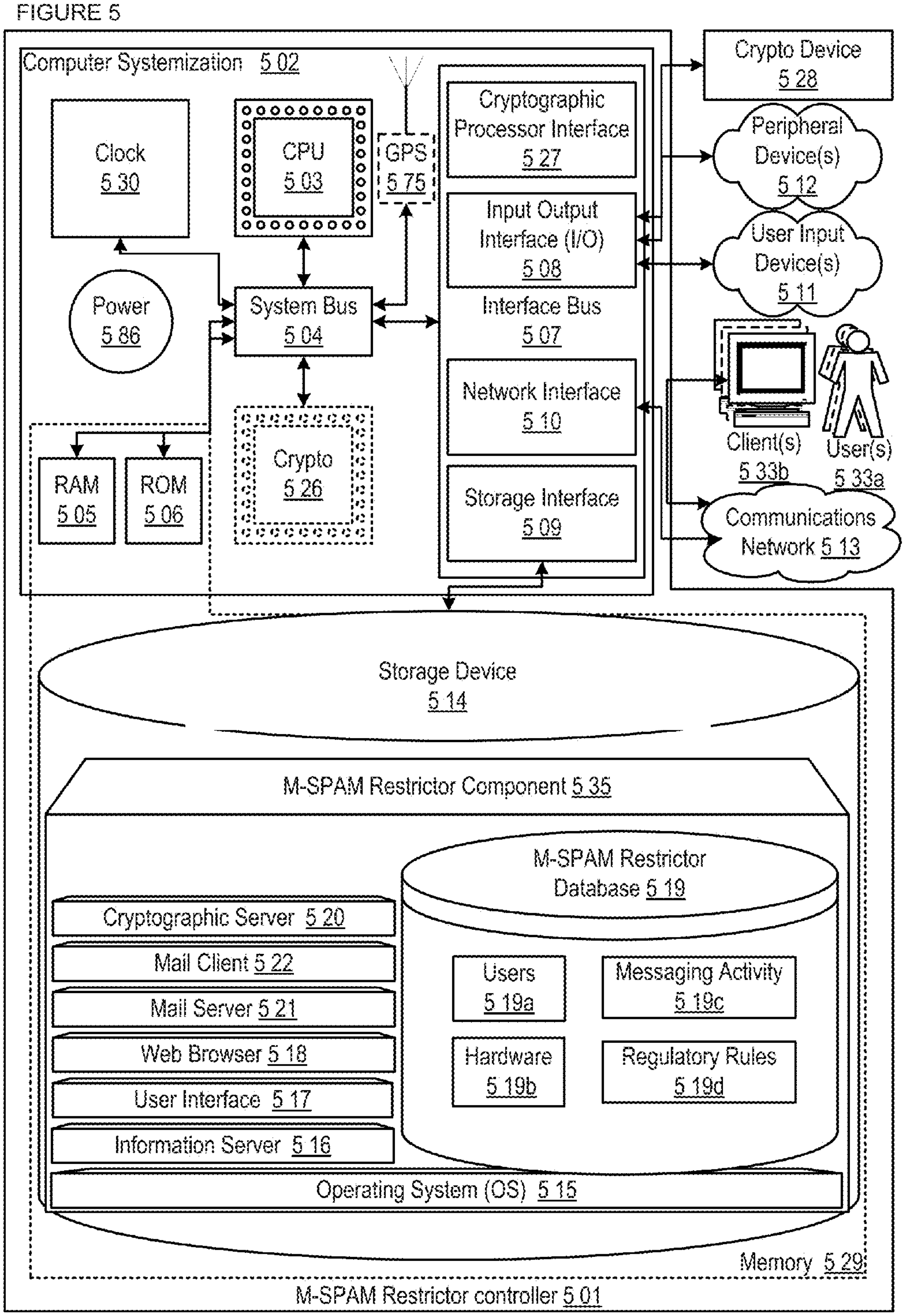
FIG. 5 is of a block diagram illustrating exemplary embodiments of a M-SPAM Restrictor controller.

FIG. 5 of the present disclosure illustrates inventive aspects of an M-SPAM Restrictor controller 501 in a block diagram.

Typically, users, which may be people and/or other systems, engage information technology systems (e.g., commonly computers) to facilitate information processing. In turn, computers employ processors to process information; such processors are often referred to as central processing units (CPUs). A common form of processor is referred to as a microprocessor. CPUs use communicative signals to enable various operations. Such communicative signals may be stored and/or transmitted in batches as program and/or data components facilitate desired operations. These stored instruction code signals may engage the CPU circuit components to perform desired operations. A common type of program is a computer operating system, which, commonly, is executed by CPU on a computer; the operating system enables and facilitates users to access and operate computer information technology and resources. Common resources employed in information technology systems include: input and output mechanisms through which data may pass into and out of a computer; memory storage into which data may be saved; and processors by which information may be processed. Often information technology systems are used to collect data for later retrieval, analysis, and manipulation, commonly, which is facilitated through a database program. Information technology systems, such as database management systems, and/or the like provide interfaces that allow users to access and operate various system components.

In one embodiment, the M-SPAM Restrictor controller 501 may be connected to and/or communicate with entities such as, but not limited to: one or more users from user input devices 511; peripheral devices 512; a cryptographic processor device 528; and/or a communications network 513.

Networks are commonly thought to comprise the interconnection and interoperation of clients, servers, and intermediary nodes in a graph topology. It should be noted that the term "server" as used throughout this disclosure refers generally to a computer, other device, program, or combination thereof that processes and responds to the requests of remote users across a communications network. Servers serve their information to requesting "clients." The term "client" as used herein refers generally to a computer, other device, program, or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The M-SPAM Restrictor controller 501 may be based on common computer systems that may comprise, but are not limited to, components such as: a computer systemization 502 connected to memory 529.

Computer Systemization

A computer systemization 502 may comprise a clock 530, central processing unit (CPU) 503, a read only memory (ROM) 506, a random access memory (RAM) 505, and/or an interface bus 507, and most frequently, although not necessarily, the foregoing are all interconnected and/or communicating through a system bus 504. Optionally, the computer systemization may be connected to an internal power source 586. Optionally, a cryptographic processor 526 and/or a global positioning system (GPS) component 575 may be connected to the system bus. The system clock typically has a crystal oscillator and provides a base signal. The clock is typically coupled to the system bus and various clock multipliers that will increase or decrease the base operating frequency for other components interconnected in the computer systemization. The clock and various components in a computer systemization drive signals embodying information throughout the system. Such transmission and reception of signals embodying information throughout a computer systemization may be commonly referred to as communications. These communicative signals may further be transmitted, received, and the cause of return and/or reply signal communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s). The CPU interacts with memory through signal passing through conductive conduits to execute stored signal program code according to conventional data processing techniques. Such signal passing facilitates communication within the M-SPAM Restrictor controller and beyond through various interfaces. Should processing requirements dictate a greater amount of speed, parallel, mainframe and/or super-computer architectures may similarly be employed. Alternatively, should deployment requirements dictate greater portability, smaller Personal Digital Assistants (PDAs) may be employed.

Power Source

The power source 586 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 586 is connected to at least one of the interconnected subsequent components of the M-SPAM Restrictor controller thereby providing an electric current to all subsequent components. In one example, the power source 586 is connected to the system bus component 504. In an alternative embodiment, an outside power source 586 is provided through a connection across the I/O 508 interface. For example, a USB and/or IEEE 1394 connection carries both data and power across the connection and is therefore a suitable source of power.

Interface Adapters

Interface bus(es) 507 may accept, connect, and/or communicate to a number of interface adapters, conventionally although not necessarily in the form of adapter cards, such as, but not limited to: input output interfaces (I/O) 508, storage interfaces 509, network interfaces 510, and/or the like. Optionally, cryptographic processor interfaces 527 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 509 may accept, communicate, and/or connect to a number of storage devices such as, but not limited to: storage devices 514, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 510 may accept, communicate, and/or connect to a communications network 513. Through a communications network 513, the M-SPAM Restrictor controller is accessible through remote clients 533*b* (e.g., computers with web browsers) by users 533*a*. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 510 may be used to engage with various communications network types 513. For example, multiple network interfaces may be employed to allow for the communication over broadcast, multicast, and/or unicast networks.

Input Output interfaces (I/O) 508 may accept, communicate, and/or connect to user input devices 511, peripheral devices 512, cryptographic processor devices 528, and/or the like. I/O may employ connection protocols such as, but not limited to: Apple Desktop Bus (ADB); Apple Desktop Connector (ADC); audio: analog, digital, monaural, RCA, stereo, and/or the like; IEEE 1394a-b; infrared; joystick; keyboard; midi; optical; PC AT; PS/2; parallel; radio; serial; USB; video interface: BNC, coaxial, composite, digital, Digital Visual Interface (DVI), RCA, RF antennae, S-Video, VGA, and/or the like; wireless; and/or the like. A common output device is a television set, which accepts signals from a video interface. Also, a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Typically, the video interface provides the composited video information through a video connection interface that accepts a video display interface (e.g., an RCA composite video connector accepting an RCA composite video cable; a DVI connector accepting a DVI display cable, etc.).

User input devices 511 may be card readers, dongles, finger print readers, gloves, graphics tablets, joysticks, keyboards, mouse (mice), remote controls, retina readers, trackballs, trackpads, and/or the like.

Peripheral devices 512 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the M-SPAM Restrictor controller may be embodied as an embedded, dedicated, and/or monitor-less (i.e., headless) device, wherein access would be provided over a network interface connection.

Cryptographic units such as, but not limited to, microcontrollers, processors 526, interfaces 527, and/or devices 528 may be attached, and/or communicate with the M-SPAM Restrictor controller. A MC68HC16 microcontroller, commonly manufactured by Motorola Inc., may be used for and/or within cryptographic units. Equivalent microcontrollers and/or processors may also be used. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allow for anonymous transactions. Cryptographic units may also be configured as part of CPU. Other commercially available specialized cryptographic processors include VLSI Technology's 33 MHz 6868 or Semaphore Communications' 40 MHz Roadrunner 184.

Memory

Generally, any mechanization and/or embodiment allowing a processor to affect the storage and/or retrieval of information is regarded as memory 529. However, memory is a fungible technology and resource; thus, any number of memory embodiments may be employed in lieu of or in concert with one another. It is to be understood that the M-SPAM Restrictor controller and/or a computer systemization may employ various forms of memory 529. For example, a computer systemization may be configured wherein the functionality of on-chip. CPU memory (e.g., registers), RAM, ROM, and any other storage devices are provided by a paper punch tape or paper punch card mechanism; of course, such an embodiment would result in an extremely slow rate of operation. In a typical configuration, memory 529 will include ROM 506, RAM 505, and a storage device 514. A storage device 514 may be any conventional computer system storage. Storage devices may include a drum; a (fixed and/or removable) magnetic disk drive; a magneto-optical drive; an optical drive (i.e., CD ROM/RAM/Recordable (R), ReWritable (RW), DVD R/RW, etc.); an array of devices (e.g., Redundant Array of Independent Disks (RAID)); and/or other devices of the like. Thus, a computer systemization generally requires and makes use of memory.

Component Collection

The memory 529 may contain a collection of program and/or database components and/or data such as, but not limited to: operating system component(s) 515 (operating system); information server component(s) 516 (information server); user interface component(s) 517 (user interface); Web browser component(s) 518 (Web browser); database(s) 519; mail server component(s) 521; mail client component(s) 522; cryptographic server component(s) 520 (cryptographic server); the M-SPAM Restrictor component(s) 535; and/or the like (i.e., collectively a component collection). These components may be stored and accessed from the storage devices and/or from storage devices accessible through an interface bus. Although non-conventional program components such as those in the component collection, typically, are stored in a local storage device 514, they may also be loaded and/or stored in memory such as: peripheral devices, RAM, remote storage facilities through a communications network, ROM, various forms of memory, and/or the like.

Operating System

The operating system component 515 is an executable program component facilitating the operation of the M-SPAM Restrictor controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the M-SPAM Restrictor controller to communicate with other entities through a communications network 513. Various communication protocols may be used by the M-SPAM Restrictor controller as a subcarrier transport mechanism for interaction, such as, but not limited to: multicast, TCP/IP, UDP, unicast, and/or the like.

Information Server

An information server component 516 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, Java, JavaScript, Practical Extraction Report Language (PERL), Hypertext Pre-Processor (PHP), pipes, Python, WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the M-SPAM Restrictor controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html.". Additionally, other information serving protocols may be employed across various ports, e.g., FTP communications across port 21, and/or the like. An information server may communicate to and/or with other components in a component collection, including itself, and/or facilities of the like. Most frequently, the information server communicates with the M-SPAM Restrictor database 519, operating systems, other program components, user interfaces, Web browsers, and/or the like.

Access to the M-SPAM Restrictor database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the M-SPAM Restrictor system. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the M-SPAM Restrictor system as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NTNista (i.e., Aero)/XP, or Unix's X-Windows (e.g., which may include additional Unix graphic interface libraries and layers such as K Desktop Environment (KDE), mythTV and GNU Network Object Model Environment (GNOME)), provide a baseline and means of accessing and displaying information graphically to users.

A user interface component 517 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact with, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 518 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Some Web browsers allow for the execution of program components through facilities such as Java, JavaScript, ActiveX, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Of course, in entity of a Web browser and information server, a combined application may be developed to perform similar functions of both. The combined application would similarly affect the obtaining and the provision of information to users, user agents, and/or the like from the M-SPAM Restrictor system enabled nodes. The combined application may be nugatory on systems employing standard Web browsers.

Mail Server

A mail server component 521 is a stored program component that is executed by a CPU 503. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the M-SPAM Restrictor system.

Access to the M-SPAM Restrictor system mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 522 is a stored program component that is executed by a CPU 503. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 520 is a stored program component that is executed by a CPU 503, cryptographic processor 526, cryptographic processor interface 527, cryptographic processor device 528, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the M-SPAM Restrictor system may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the M-SPAM Restrictor component to engage in secure transactions if so desired. The cryptographic component facilitates the secure accessing of resources on the M-SPAM Restrictor system and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The M-SPAM Restrictor Database

The M-SPAM Restrictor database component 519 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the M-SPAM Restrictor database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data, but may have other types of functionality encapsulated within a given object. If the M-SPAM Restrictor database is implemented as a data-structure, the use of the M-SPAM Restrictor database 519 may be integrated into another component such as the M-SPAM Restrictor component 535. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 519 includes several tables 519*a-d*. A Users table 519*a* may include fields such as, but not limited to: user_ID, user_name, user_password, contact_info, hardware_ID, mobile_device_type, usage_history, SPAM_record, and/or the like. A Hardware table 519*b* may include fields such as, but not limited to: hardware_ID, hardware_type, hardware_name, data_formatting_requirements, protocols, addressing_info, usage_history, hardware_requirements, user_ID, and/or the like. A messaging activity table 519*b* may include fields such as, but not limited to: msg_ID, msg_source, msg_destination, msg_size, msg_time, msg_type, msg_stat, and/or the like. A regulatory rules 519*d* may include fields such as, but not limited to: rule_ID, rule_content, rule_authority, rule_time, and/or the like. These tables may support and/or track multiple entity accounts on the M-SPAM Restrictor controller.

In one embodiment, the M-SPAM Restrictor database may interact with other database systems. For example, employing a distributed database system, queries and data access by search M-SPAM Restrictor component may treat the combination of the M-SPAM Restrictor database, an integrated data security layer database as a single database entity.

In one embodiment, user programs may contain various user interface primitives, which may serve to update the M-SPAM Restrictor system. Also, various accounts may require custom database tables depending upon the environments and the types of clients the M-SPAM Restrictor system may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 519*a-d*. The M-SPAM Restrictor system may be configured to keep track of various settings, inputs, and parameters via database controllers.

The M-SPAM Restrictor database may communicate to and/or with other components in a component collection, including itself, and/or facilities of the like. Most frequently, the M-SPAM Restrictor database communicates with the M-SPAM Restrictor component, other program components, and/or the like. The database may contain, retain, and provide information regarding other nodes and data.

The M-SPAM Restrictor Component

The M-SPAM Restrictor component 535 is a stored program component that is executed by a CPU. In one embodiment, the M-SPAM Restrictor component incorporates any and/or all combinations of the aspects of the M-SPAM Restrictor that was discussed in the previous figures. As such, the M-SPAM Restrictor affects accessing, obtaining and the provision of information, services, transactions, and/or the like across various communications networks.

The M-SPAM Restrictor component is configurable to access, calculate, engage, exchange, generate, identify, instruct, match, process, search, serve, store, and/or facilitate communication channels between M-SPAM Restrictor components and/or affiliated entities, monitoring messaging activities from different message sources, and/or the like and use of the M-SPAM.

The M-SPAM Restrictor component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, WebObjects, and/or the like. In one embodiment, the M-SPAM Restrictor server employs a cryptographic server to encrypt and decrypt communications. The M-SPAM Restrictor component may communicate to and/or with other components in a component collection, including itself, and/or facilities of the like. Most frequently, the M-SPAM Restrictor component communicates with the M-SPAM Restrictor database, operating systems, other program components, and/or the like. The M-SPAM may contain, communicate, generate, obtain, and/or provide program component, system, user, and/or data communications, requests, and/or responses.

Distributed M-SPAM Restrictor

The structure and/or operation of any of the M-SPAM node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the M-SPAM Restrictor controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), local and remote application program interfaces Jini, Remote Method Invocation (RMI), process pipes, shared files, and/or the like. Messages sent between discrete component components for inter-application communication or within memory spaces of a singular component for intra-application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between components. Again, the configuration will depend upon the context of system deployment.

The entirety of this disclosure (including the Cover Page, Title, Headings, Field, Background, Summary, Brief Description of the Drawings, Detailed Description, Claims, Abstract, Figures, and otherwise) shows by way of illustration various embodiments in which the claimed inventions may be practiced. The advantages and features of the disclosure are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

What is claimed is:

1. A method, comprising:

receiving a plurality of mobile terminated messages from a message source;

estimating an instant message rate of the message source based on the received plurality of mobile terminated messages;

accessing a message rate limit for the message source, wherein the message rate is at least one of a number of bits per unit of time or a number of messages received per unit of time, and the message rate limit is determined by at least one of:

a) analyzing historical data of messaging activity, wherein the analyzing historical data of messaging activity comprises collecting statistical data of historical message traffic from the message source, wherein the statistical data of historical message traffic comprises at least one of average message rate over time, peak values of message rate over time, variance of the message rate, or standard deviation of the message rate, and b) simulating, via a Monte Carlo simulation, a process of manually generating and sending a message, and calculating an average time to accomplish the process;

comparing the estimated message rate of the message source with the accessed message rate limit; and identifying the message source as a spam suspect and suspending all subsequent messages sent from the message source if the estimated message rate of the message source exceeds the accessed message rate limit.

2. The method of claim 1, wherein the message source comprises at least one of: (i) a mobile device; (ii) a wired telephone; and (iii) an Internet-based mobile terminated message service system.

3. The method of claim 1, wherein the estimating an instant message rate of the message source comprises:

measuring a total volume of message traffic originating from the message source during a predetermined short time interval starting at an instant timestamp; and calculating the instant message rate of the message source for the instant timestamp based on the recorded message traffic volume and a length of the predetermined short time interval.

4. The method of claim 3, wherein estimating an instant message rate of the message source is implemented periodically for every short time interval.

5. The method of claim 3, wherein the length of the short time interval is predetermined by a system administrator.

6. The method of claim 1, wherein the analyzing historical data of messaging activity further comprises:

collecting statistical data of historical message traffic from the message source, wherein the statistical data of historical message traffic comprises average message rate over time, peak values of message rate over time, variance of the message rate, standard deviation of the message rate.

7. The method of claim 1, wherein the simulating a process of manually generating a message and sending the message via a mobile device comprises:

performing a Monte Carlo simulation to calculate average time to accomplish a plurality of steps of sending the message via a mobile device.

8. The method of claim 7, wherein the plurality of steps of sending the message via a mobile device comprises:

selecting a messaging mode from a group of text, picture and video;

entering a message destination;

composing the message by entering content of the message;

sending the message;

waiting for an acknowledgement notice to indicate the message has been successfully sent; and clearing the display of the mobile device.

9. The method of claim 1, wherein the message rate limit further depends on a plurality of dynamic factors, comprising at least one of: (i) time and date; (ii) geographical location; (iii) activities of interrelated message sources; and (iv) administrative weighing factors.

10. The method of claim 1, wherein the comparing the estimated message rate of the message source with the determined message rate limit is implemented periodically at every predetermined short time interval.

11. The method of claim 1, wherein identifying the message source as a spam suspect comprises:

recording at least one violation of the message source; and identifying the message source as a spam suspect if a totality of the at least one violation of the message source exceeds a predetermined tolerance level.

12. The method of claim 11, wherein the predetermined tolerance level comprises:

a maximum number count of violations; and a maximum volume of spam traffic.

13. The method of claim 1 further comprising:

receiving a notice from a network carrier indicating an approval of resuming message service for the message source if the message source has been dealt with by the network carrier; and resuming message service of the message source.

14. The method of claim 13, wherein the network carrier comprises a service provider for mobile terminated messages.

15. The method of claim 1 further comprises:

reporting the message source to a regulatory authority if the message source is identified as a spam suspect with severe violation.

16. The method of claim 1 further comprises:

generating a plurality of reports of messaging activity, wherein the plurality of reports of messaging activity comprises: (i) reports of messaging activity classified by real-time monitoring; (ii) reports of messaging activity classified by calendar time and geographical region; (iii) reports of messaging activity classified by message type; and (iv) reports of messaging activity classified by message source type.

17. The method of claim 16, wherein the plurality of reports of messaging activity comprises statistical analysis of historical messaging traffic data.

18. The method of claim 1, wherein the historical data of messaging activity includes information on general messaging activity and information on SPAM activity.

19. A system, comprising:

a processor;

a memory in communication with the processor and containing program instructions;

an input and output device in communication with the processor and memory comprising a graphical interface;

wherein the processor executes program instructions contained in the memory and the program instructions cause the processor to:

receive receiving a plurality of mobile terminated messages from a message source;

estimate an instant message rate of the message source based on the received plurality of mobile terminated messages;

access a message rate limit for the message source, wherein the message rate is at least one of a number of bits per unit of time or a number of messages received per unit of time, and wherein the message rate limit is determined by at least one of:

analyzing historical data of messaging activity, wherein the analyzing historical data of messaging activity comprises collecting statistical data of historical message traffic from the message source, wherein the statistical data of historical message traffic comprises at least one of average message rate over time, peak values of message rate over time, variance of the message rate, or standard deviation of the message rate, and simulating, via a Monte Carlo simulation, a process of manually generating a message and sending the message, and calculating an average time to accomplish the process;

compare the estimated message rate of the message source with the accessed message rate limit; and identify the message source as a spam suspect and suspending all subsequent messages sent from the message source if the estimated message rate of the message source exceeds than the accessed message rate limit.

20. A non-transitory computer-accessible storage medium stores processor readable instructions, wherein the processor readable instructions when executed by a processor causes the processor to:

receive a plurality of mobile terminated messages from a message source;

estimate an instant message rate of the message source based on the received plurality of mobile terminated messages;

access a determined instant message rate limit for the message source, wherein the message rate is at least one of a number of bits per unit of time or a number of messages received per unit of time, and wherein the instant message rate limit is determined by:

analyzing historical data of messaging activity, wherein the analyzing historical data of messaging activity comprises collecting statistical data of historical message traffic from the message source, wherein the statistical data of historical message traffic comprises at least one of average message rate over time, peak values of message rate over time, variance of the message rate, or standard deviation of the message rate, and simulating, via a Monte Carlo simulation, a process of manually generating a message and sending the message, and calculating an average time to accomplish the process;

compare the estimated instant message rate of the message source with the accessed instant message rate limit; and identify the message source as a spam suspect and suspending all subsequent messages sent from the message source if the estimated instant message rate of the message source exceeds than the accessed instant message rate limit.

* * * * *